Patented July 11, 1939

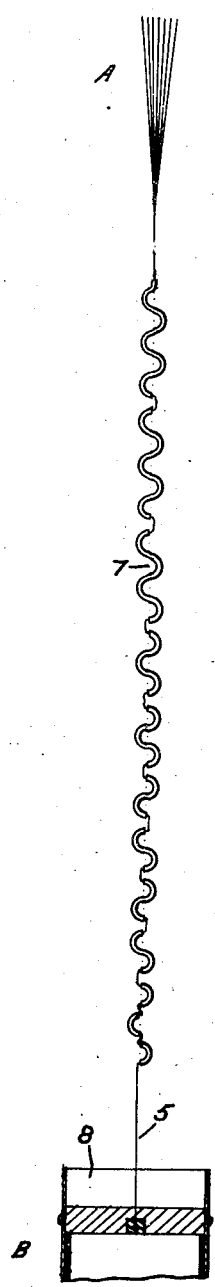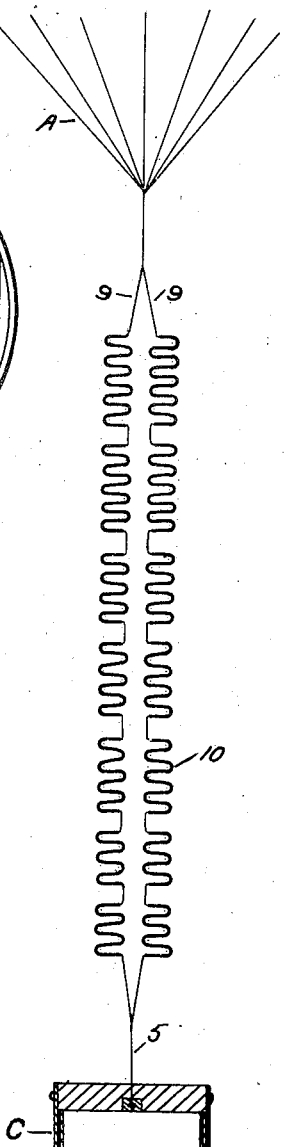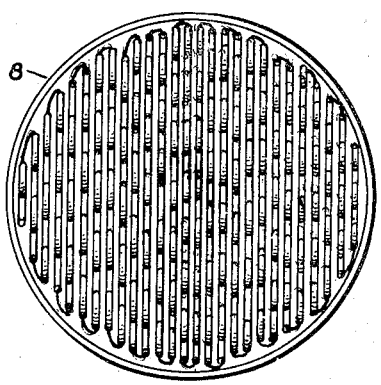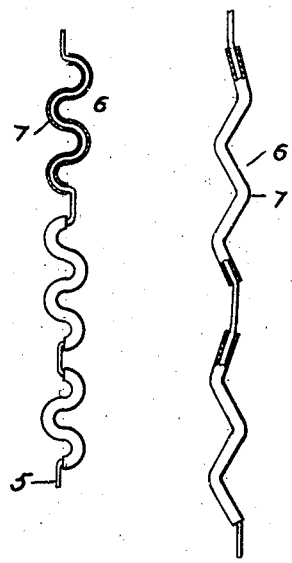

2,165,273

UNITED STATES PATENT OFFICE 2,165,273

SHOCK ABSORBING DEVICE

Gregory J. Kessenich, Madison, Wis.

Application May 10, 1938, Serial No. 207,106

2 Claims. (Cl. 244—138)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a shock absorbing device and more particularly it has reference to that class of shock absorbers which are particularly adapted to parachute suspensions though not limited thereto.

When a parachute and a body to be suspended thereby are traveling at high speed at the time the parachute is opened, the shock occasioned by the sudden retardation is frequently sufficient to cause the shrouds or the fabric of the parachute to give away or to cause injury to the suspended body.

The purpose of this invention is to associate shock absorbing elements with the suspension cable and to so form and arrange the elements that they will resist straightening of the cable and thereby provide a gradual retardation of the suspended body when the parachute is opened.

A further object of the invention is to so form the shock absorbing elements that they may be conveniently packed into a container without loss of space.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a view in side elevation of the shock absorbing device prior to opening of the parachute;

Fig. 2 is an enlarged view partly in side elevation and partly in section of a portion of the device as shown in Fig. 1;

Fig. 3 is a similar view with the suspension cable under tension and the shock absorbing element partly straightened out;

Fig. 4 is a plan view showing a method of packing the shock absorbing device in a cylindrical container;

Fig. 5 is a view in side elevation illustrating duplicate shock absorbing devices.

Referring to the drawing by characters of reference there are shown the shrouds A of a parachute and a body B connected to the shrouds by a flexible suspension cable 5. A plurality of tubes 6—6 of bendable material, such as copper, are strung on the cable 5, and are formed with one or more folds or bends 7 which will resist straightening out due to the pull of the cable.

The bent tubes are normally carried in a container 8 which may be associated with either the body or the shrouds or which may be independent of these members. When the container is cylindrical as shown in Fig. 4 the tube or tubes having the largest number of bends are disposed diametrically of the container and the tubes with decreasing number of bends are placed in order on the sides thereof.

It is to be understood that the short sections of tubes strung on the flexible cable 5 may be packed in a vertical or a horizontal position and within a container of any shape.

In Fig. 5 duplicate suspension cables 9—9 on each of which tubes 10 are strung, may be employed and instead of packing them in a container they may be wrapped around the body C.

When the parachute and the body to be suspended thereby are released in space their separation causes the cable 5 and tubes 6 to be withdrawn from the container as shown in Fig. 1. The parachute on opening is retarded and the energy of the falling body is gradually absorbed by the straightening out of the tubes due to the pull of the cable. This yielding action of the tubes reduces the velocity of the unit in falling and reduces the shock to the elements of the unit. Breaking of the tubes after bending will not interfere with the accomplishment of their mission.

I claim.

1. A shock absorbing device comprising a flexible cable and a plurality of bent and bendable tubes strung on the cable and having one or more folds in a common plane for yieldingly resisting straightening out when tension is applied to the cable and adapted to remain straightened out.

2. A shock absorbing device comprising a flexible cable and a plurality of bent and bendable tubes strung on the cable and having a variable number of folds in a common plane for yieldingly resisting straightening out when tension is applied to the cable and adapted to remain straightened out.

GREGORY J. KESSENICH.